US005937844A

United States Patent [19]
Kiuchi et al.

[11] Patent Number: 5,937,844
[45] Date of Patent: Aug. 17, 1999

[54] METHOD FOR SLICING CYLINDRICAL WORKPIECES BY VARYING SLURRY CONDITIONS AND WIRE FEED RATE DURING SLICING

[75] Inventors: Etsuo Kiuchi, Gunma; Kazuo Hayakawa, Takasaki; Kohei Toyama, Shirakawa, all of Japan

[73] Assignee: Shin-Etsu Handotai Co., Ltd., Tokyo, Japan

[21] Appl. No.: 08/823,208

[22] Filed: Mar. 24, 1997

[30] Foreign Application Priority Data

| | | | |
|---|---|---|---|
| Mar. 26, 1996 | [JP] | Japan | 8-096163 |
| Mar. 26, 1996 | [JP] | Japan | 8-096164 |
| Mar. 26, 1996 | [JP] | Japan | 8-096165 |

[51] Int. Cl.[6] ..... B28D 1/08
[52] U.S. Cl. ..... 125/16.02; 125/21
[58] Field of Search ..... 83/651.1; 125/12, 125/16.01, 16.02, 21

[56] References Cited

U.S. PATENT DOCUMENTS

| | | | |
|---|---|---|---|
| 3,599,623 | 8/1971 | Phy | 125/21 X |
| 3,831,576 | 8/1974 | Mech | 125/16.01 X |
| 3,841,297 | 10/1974 | Mech | 125/21 X |
| 4,038,962 | 8/1977 | Tessner | 125/21 |
| 5,201,305 | 4/1993 | Takeuchi | 125/16.01 X |
| 5,233,968 | 8/1993 | Vannucci | 125/16.01 |
| 5,269,285 | 12/1993 | Toyama et al. | 125/16.01 |
| 5,564,409 | 10/1996 | Bonzo et al. | 125/16.01 X |
| 5,616,065 | 4/1997 | Egglhuber | 125/16.01 X |
| 5,735,258 | 4/1998 | Okuno et al. | 125/21 X |

OTHER PUBLICATIONS

Patent Abstracts of Japan; vol. 006, No. 109 (M–137), Jun. 19, 1982 & JP 57 041118 A (Sumitomo Electric Ind Ltd), Mar. 8, 1982, *abstract*.

Patent Abstracts of Japan; vol. 013, No. 282 (M–843), Jun. 28, 1989 & JP 01 078802 A (Daiwa Kikai Seisakusho:KK), Mar. 24, 1989, *abstract*.

Patent Abstracts of Japan; vol. 011, No. 344 (M–640), Nov. 11, 1987 & JP 62 124822 A (Inoue Japax Res Inc), Jun. 6, 1987, *abstract*.

*Primary Examiner*—Timothy V. Eley
*Attorney, Agent, or Firm*—Oliff & Berridge, PLC

[57] ABSTRACT

In a wire saw for slicing a cylindrical workpiece such as a silicon ingot so as to obtain wafers or the like, the feed rate of slurry fed to the workpiece, the viscosity of the slurry, or the feed rate of a wire is varied according to the cutting length in the workpiece or the angle between the wire and the circumference of the workpiece. It becomes possible to obtain wafers or the like, each having a uniform thickness.

14 Claims, 10 Drawing Sheets

42
34
40
30
20
24
12
32
12
12
22
12
10A
10B
10C
M
7
A
20, 30: TENSION-ADJUSTING MECHANISM 20, 30: TENSION-ADJUSTING MECHANISM
10A
10B
10C
12
20
22
24
30
32
34
40
42
M
7
A 56B
50B
52B
12
40
54B
42
10B
10C
10A
54A
d
r
12
50A
56A
52A 50B
64
66
64
40
10B
10C
60
63
72
10A
42
12
61
62
50A
70
84
82
80

METHOD FOR SLICING CYLINDRICAL WORKPIECES BY VARYING SLURRY CONDITIONS AND WIRE FEED RATE DURING SLICING

BACKGROUND OF THE INVENTION

1. Field of the Invention

The present invention relates to a wire saw and a method of slicing a cylindrical workpiece of a fragile material such as a semiconductor ingot of silicon, gallium arsenide, or the like, so as to obtain wafers or wafer-shaped plates.

2. Description of the Related Art

In a wire saw, a wire is spirally wound around a plurality of rollers such that turns of the wire extend between rollers in parallel at a predetermined pitch. A cylindrical workpiece of a semiconductor ingot or the like or a quadrangularly prismatic workpiece of a synthetic quartz ingot or the like is pressed against the thus-arranged wire. Simultaneously, the wire is moved in its lengthwise direction, while a machining solution containing abrasives (hereinafter referred to as slurry) is fed between the workpiece and the wire, thereby concurrently slicing the workpiece into many (for example, several hundred) wafers having a predetermined thickness.

However, in contrast with a quadrangularly prismatic workpiece of a synthetic quartz ingot or the like, when a cylindrical workpiece of a semiconductor ingot is sliced using the above-described wire saw, an obtained wafer has a problem that thickness is different among a portion where slicing started, a central portion, and a portion where slicing ended.

That is, as shown in FIG. 1A, the thickness of the portion of a wafer where slicing started or ended becomes relatively thin, while the thickness of the central portion of a wafer becomes relatively thick. That is, the thickness of each sliced wafer varies such that the wafer is convex on both sides thereof. This variation of thickness is observed in almost all wafers which are obtained from the same workpiece in a single slicing process. Also, this variation of thickness is peculiar to the slicing of a cylindrical workpiece through the use of a wire saw and tends to intensify as the diameter of a cylindrical workpiece increases. Therefore, this variation of thickness raises a significant problem in slicing of wafers from a silicon semiconductor single crystal, because these wafers are required to have a uniform thickness, and the degree of integration of devices has been increased, so that the diameter of each wafer has been increased to 200 mm, 300 mm, or even more.

SUMMARY OF THE INVENTION

The present invention has been accomplished to solve the above-mentioned problems, and it is an object of the invention to provide a method and apparatus for slicing a cylindrical workpiece into wafers, each having a uniform thickness, with a wire saw.

To achieve the above object, according to a first aspect of the present invention, there is provided a method of slicing a cylindrical workpiece with a wire saw wherein the feed rate of slurry fed to the workpiece is varied according to the cutting length in the workpiece or the angle between a wire and the circumference of the workpiece.

Preferably, the feed rate of slurry fed to a cylindrical workpiece is increased as the cutting length in the workpiece increases, and subsequently the feed rate of slurry is decreased as the cutting length decreases. Also, preferably, the feed rate of slurry is varied such that as compared with the rate of increase in the feed rate of slurry during slicing from a slicing start portion to the central portion of a cylindrical workpiece, the rate of decrease in the feed rate of slurry during slicing from the central portion of the workpiece to a slicing end portion is made lower.

The term "cutting length" is used herein to refer to the length of cut portion of the workpiece in contact with the wire.

The feed rate of slurry fed to the cylindrical workpiece can be varied through a change of the flow rate of slurry fed to a wire array or a change of the feed position of slurry.

Preferably, the feed position of slurry is varied along a wire between a position in the proximity of a cylindrical workpiece and a position corresponding to a far end of a roller as viewed from the workpiece. In this case, the feed position of slurry may be located most distant from the workpiece when slicing starts, and may be moved toward the workpiece as the cutting length increases. When the cutting length reaches a maximum, the feed position of slurry may be located closest to the workpiece. Subsequently, as the cutting length decreases, the feed position of slurry may be moved away from the workpiece.

A wire saw of the present invention for slicing a cylindrical workpiece comprises means for varying the feed rate of slurry fed to the workpiece according to the cutting length in the workpiece or the angle between a wire and the circumference of the workpiece. The means for varying the feed rate of slurry fed to a workpiece may be means for varying the flow rate of slurry or means for varying the feed position of slurry. The means for varying the feed position of slurry can move a slurry feed nozzle toward or away from a workpiece along a wire.

In a method and a wire saw for slicing a cylindrical workpiece according to the first aspect of the present invention, the amount of slurry fed to the workpiece is varied according to the cutting length in the workpiece or the angle between a wire and the circumference of the workpiece, thereby significantly decreasing variation in the thickness of a wafer. As an additional effect produced, the rate of generation of a cracked wafer during slicing is decreased, thereby improving the yield of slicing and productivity.

According to a second aspect of the present invention, there is provided a method of slicing a cylindrical workpiece with a wire saw, wherein the viscosity of slurry fed to the workpiece is varied according to the cutting length in the workpiece or the angle between a wire and the circumference of the workpiece.

In this case, through the change of the viscosity of the slurry fed to a cylindrical workpiece, a work amount on the workpiece is adjusted to a constant value, thereby uniforming the thickness of a sliced wafer.

Preferably, the viscosity of the slurry is increased as the cutting length in a cylindrical workpiece increases, and subsequently is decreased as the cutting length in the workpiece decreases.

In this case, through the change of the viscosity of the slurry according to the cutting length in a cylindrical workpiece, a wafer having a uniform thickness can be obtained.

Preferably, the viscosity of the slurry is varied such that as compared with the rate of increase in the viscosity of the slurry during slicing from a slicing start portion to the central portion of a cylindrical workpiece, the rate of decrease in the viscosity of the slurry during slicing from the central portion of the workpiece to a slicing end portion is made lower.

In this case, through the employment of a different rate of change in the viscosity of the slurry between slicing from a slicing start portion to the central portion of a cylindrical workpiece and slicing from the central portion to a slicing end portion, the thickness of each wafer can be uniform.

Preferably, the viscosity of the slurry is varied through the addition of a viscosity control agent into a slurry tank. This viscosity control agent may be water, and a coolant component of slurry is desirably water-soluble.

As described above, the viscosity of the slurry can be readily varied through the addition of a viscosity control agent into a slurry tank. In this case, through the employment of water as a viscosity control agent and a water-soluble component of slurry, the viscosity of the slurry can be reliably controlled at low cost.

A wire saw of the present invention for slicing a cylindrical workpiece comprises means for varying the viscosity of the slurry fed to the workpiece according to the cutting length in the workpiece or the angle between a wire and the circumference of the workpiece.

Through the use of the above-described wire saw, a method according to the second aspect of the present invention can be carried out, and a wafer having a uniform thickness can be obtained.

The means for varying the viscosity of the slurry comprises at least a slurry viscosity detector and a flow controller for a viscosity control agent and is adapted to detect the viscosity of the slurry contained in a slurry tank and to control the flow rate of a viscosity control agent fed into the slurry tank according to the detected slurry viscosity.

The viscosity of slurry contained in the slurry tank is desirably detected by a mass flowmeter or through the measurement of conductivity. A solenoid valve or a flowmeter may be used as the flow controller for a viscosity control agent. Further, water may be used as the viscosity control agent.

In this case, the slurry tank is desirably provided with means for stirring slurry so as to make uniform the viscosity of the slurry contained in the slurry tank.

In a method and a wire saw for slicing a cylindrical workpiece according to the second aspect of the present invention, the viscosity of the slurry fed to the workpiece is varied according to the cutting length in the workpiece or the angle between a wire and the circumference of the workpiece, thereby significantly decreasing variation in the thickness of a wafer. As an additional effect produced, the rate of generation of cracked wafer during slicing is decreased, thereby improving the yield of slicing and productivity.

According to a third aspect of the present invention, there is provided a method of slicing a cylindrical workpiece with a wire saw, wherein the feed rate of a wire is varied according to the cutting length in the workpiece or the angle between a wire and the circumference of the workpiece.

In this case, through the change of the feed rate of the wire, a work amount on the workpiece is adjusted to a constant value, thereby making the thickness of a sliced wafer uniform.

Preferably, the feed rate of the wire is increased as the cutting length in a cylindrical workpiece increases, and subsequently is decreased as the cutting length in the workpiece decreases.

In this case, through the change of the feed rate of the wire according to the cutting length in a cylindrical workpiece, a wafer having a uniform thickness can be obtained.

Preferably, the feed rate of the wire is varied such that as compared with the rate of increase in the wire feed rate during slicing from a slicing start portion to the central portion of a cylindrical workpiece, the rate of decrease in the wire feed rate during slicing from the central portion of the workpiece to a slicing end portion is made lower.

In this case, through the employment of a different rate of change in the feed rate of the wire between slicing from a slicing start portion to the central portion of a cylindrical workpiece and slicing from the central portion to a slicing end portion, the thickness of a wafer can be made uniform.

A wire saw of the present invention for slicing a cylindrical workpiece comprises means for varying the feed rate of the wire according to the cutting length in the workpiece or the angle between a wire and the circumference of the workpiece.

Through the use of the above-described wire saw, a method according to the third aspect of the present invention can be carried out.

In a method and a wire saw for slicing a cylindrical workpiece according to the third aspect of the present invention, the feed rate of the wire is varied according to the cutting length in the workpiece or the angle between a wire and the circumference of the workpiece, thereby significantly decreasing variation in the thickness of a wafer. As an additional effect produced, the rate of generation of a cracked wafer during slicing is decreased, thereby improving the yield of slicing and productivity.

DESCRIPTION OF THE INVENTION AND EMBODIMENTS

The present invention will now be described in detail.

The inventors of the present invention investigated the cause of variations in the thickness of wafers which were obtained by slicing a cylindrical workpiece of a semiconductor ingot or the like. The results of the investigation implied that since the cutting length is different, for example, among the portion of the workpiece where slicing starts, the central portion of the workpiece, and the portion of the workpiece where slicing ends, the work amount of a wire and slurry on the workpiece is different among these portions. That is, when slicing starts or ends, the cutting length is short, and thus the work amount of the wire and slurry on the workpiece becomes relatively large. As a result, the removal amount or stock removal during slicing becomes relatively large, so that the thickness of each wafer decreases at these portions. By contrast, at the central portion of the workpiece, the cutting length becomes relatively long, and thus the work amount of the wire and slurry on the workpiece becomes relatively small. As a result, the removal amount or stock removal during slicing becomes relatively small, so that the thickness of each wafer increases at the central portion.

Figure 1A:
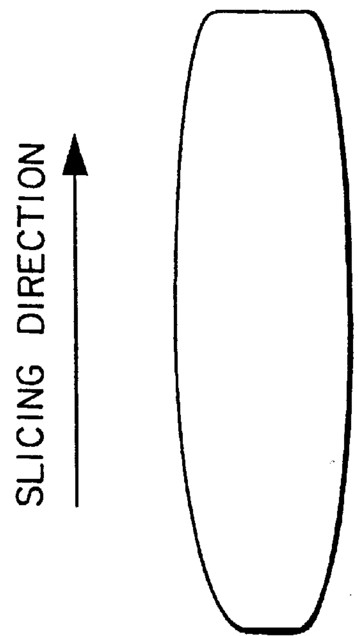
FIG. 1A is a schematic view showing the cross-section of a wafer obtained by slicing through the use of a conventional apparatus and method.

The angle between a wire and the circumference of a workpiece is acute during slicing from a slicing start portion to the central portion of a workpiece, and subsequently becomes obtuse during slicing from the central portion to a slicing end portion. Particularly, when slicing starts, the angle between the wire and the circumference of the workpiece is acute to form a wedge shape, and consequently slurry enters a cutting area efficiently. By contrast, during slicing from the central portion to a slicing end portion, the angle between a wire and the circumference of a workpiece becomes obtuse, and consequently slurry enters the cutting area less efficiently. Accordingly, when slicing starts, the work amount of a wire and slurry on a workpiece becomes particularly large. As a result, the removal amount or stock removal during slicing becomes particularly large when slicing starts. Consequently, the thickness of a wafer at the portion where slicing started is smaller than that at the portion where slicing ended even though the cutting length is substantially identical between the portions, resulting in the shape of a cross-section of a wafer as shown in FIG. 1A.

The present inventors came up with the idea of decreasing variation in the thickness of each wafer by making constant a work amount on a cylindrical workpiece irrespective of the cutting length or the angle between a wire and the circumference of the workpiece, and confirmed that the work amount on the workpiece can be made constant by changing the feed rate of slurry, the viscosity of slurry, or the feed rate of a wire according to the cutting length in the workpiece or the angle between a wire and the circumference of the workpiece.

Embodiments of the present invention will next be described with reference to the drawings. However, the present invention is not to be limited thereto.

Figure 2:
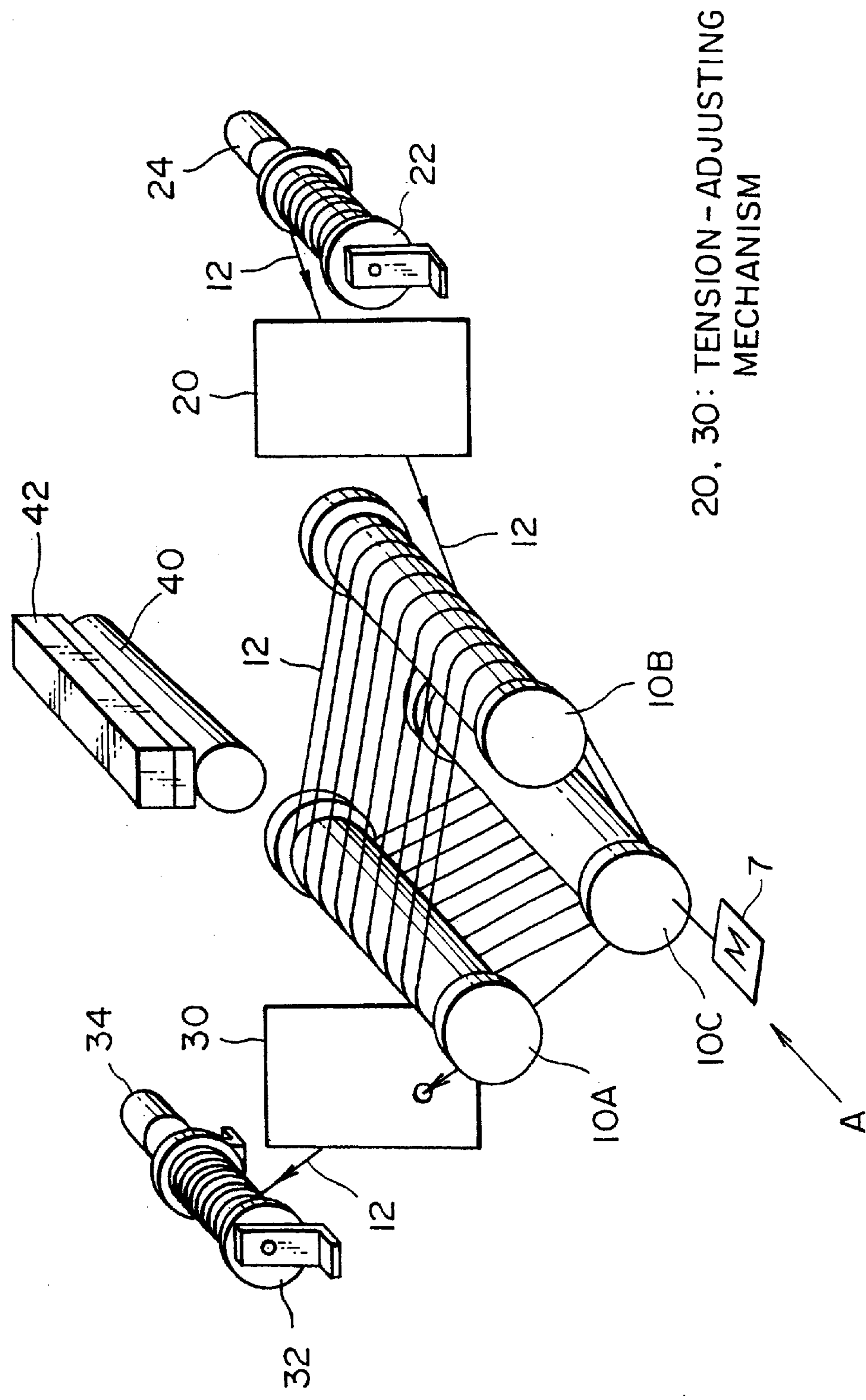
FIG. 2 is a schematic view of a wire saw.

FIG. 2 schematically shows the structure of a wire saw. In this wire saw, a wire 12 supplied from one of two wire take-up reel bobbins 22 and 32, which are driven by torque motors 24 and 34, respectively, is spirally wound around a set of three rollers 10A, 10B, and 10C, and is then taken-up by the other of the take-up reel bobbins 22 and 32. Portions of the wire 12 extends between two rollers 10A and 10B in parallel at a predetermined pitch so as to slice a workpiece. A drive motor 7 connected to the roller 10C, located underneath the rollers 10A and 10B, rotates the roller 10C to thereby feed the wire 12 at a predetermined rate. While the wire 12 is being unwound from the wire take-up reel bobbin 22 and taken up onto the other wire take-up reel bobbin 32 at a predetermined feed rate of the wire 12, and vice versa, via tension-adjusting mechanisms 20 and 30, a cylindrical workpiece 40 held by the workpiece holder 42 is pressed against a workpiece slicing section located between the two rollers 10A and 10B to thereby slice the workpiece 40. During this slicing operation, slurry from an unillustrated slurry feeder is being fed into the workpiece slicing section via the wire 12.

Figure 3:
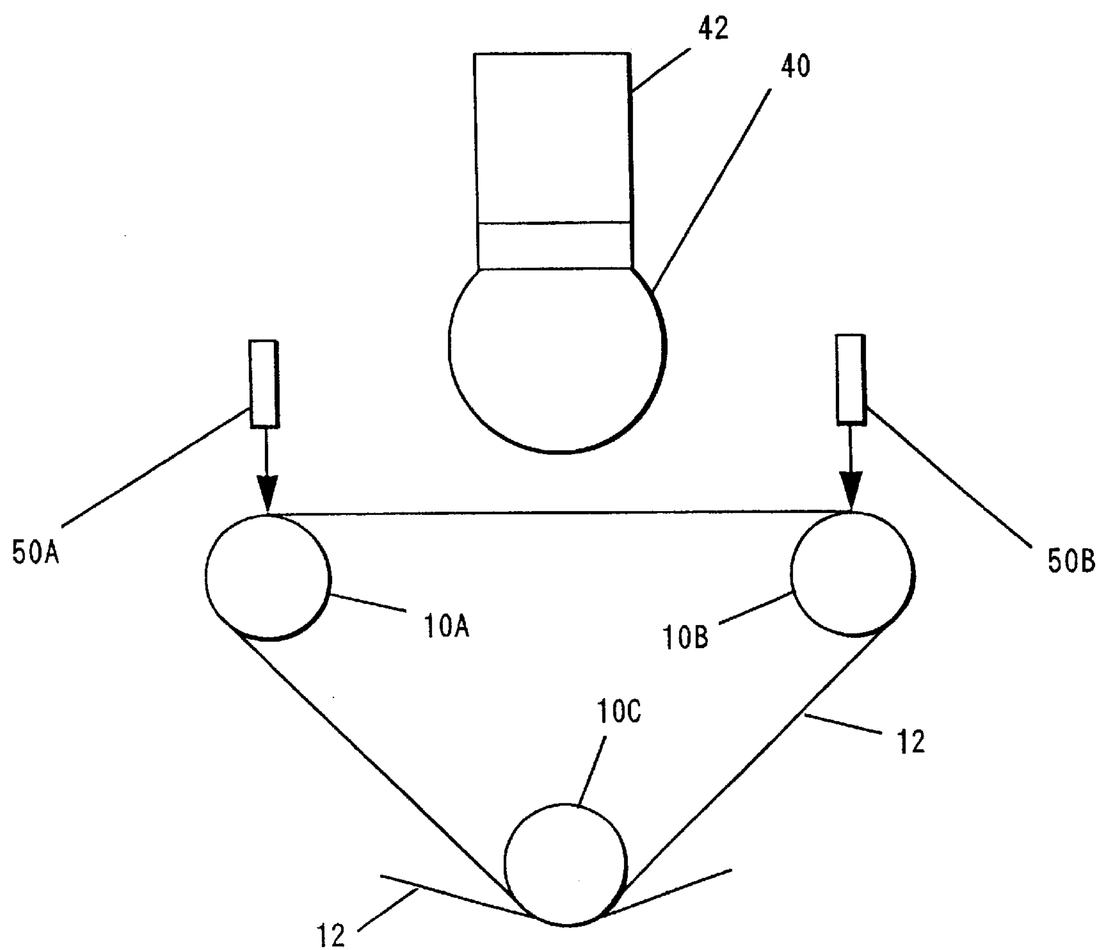
FIG. 3 is a schematic cross-section of a wire saw according to a first embodiment of the present invention.

FIG. 3 schematically shows the structure of a first embodiment of the present invention. As shown in FIG. 3, abrasive slurry is fed from slurry feed nozzles 50A and 50B located above the centerlines of the rollers 10A and 10B, respectively. Slurry is fed from the slurry feed nozzle 50A when the wire 12 is being fed in a direction from the roller 10A to the roller 10B, and from the slurry feed nozzle 50B when the wire 12 is being fed in the opposite direction. A number of the slurry feed nozzles 50A and 50B are disposed along longitudinal directions of the rollers 10A and 10B, respectively, so that slurry is fed in a curtain-like form.

In the first embodiment, the flow rate of slurry fed from the slurry feed nozzle 50A or 50B is varied according to the cutting length in the workpiece 40 or the angle between the wire 12 and the circumference of the workpiece 40, thereby varying the feed rate of the slurry fed to the workpiece 40. The flow rate of the slurry is minimized when slicing starts, then increased as the cutting length increases, and subsequently decreased as the cutting length decreases. The cutting length can be detected from the relative position between the wire 12 and the workpiece 40. For example, the cutting length can be calculated from the feed amount of the workpiece holder 42 relative to the wire 12 and the diameter of the workpiece 40. The flow rate of the slurry may be varied by changing the amount of the slurry discharged from a slurry feed pump (unillustrated), which sends the slurry under pressure from a slurry tank (unillustrated) to the slurry feed nozzle 50A or 50B, or by installing a flow controller between the slurry tank and the slurry feed nozzle 50A or 50B.

Figure 4:
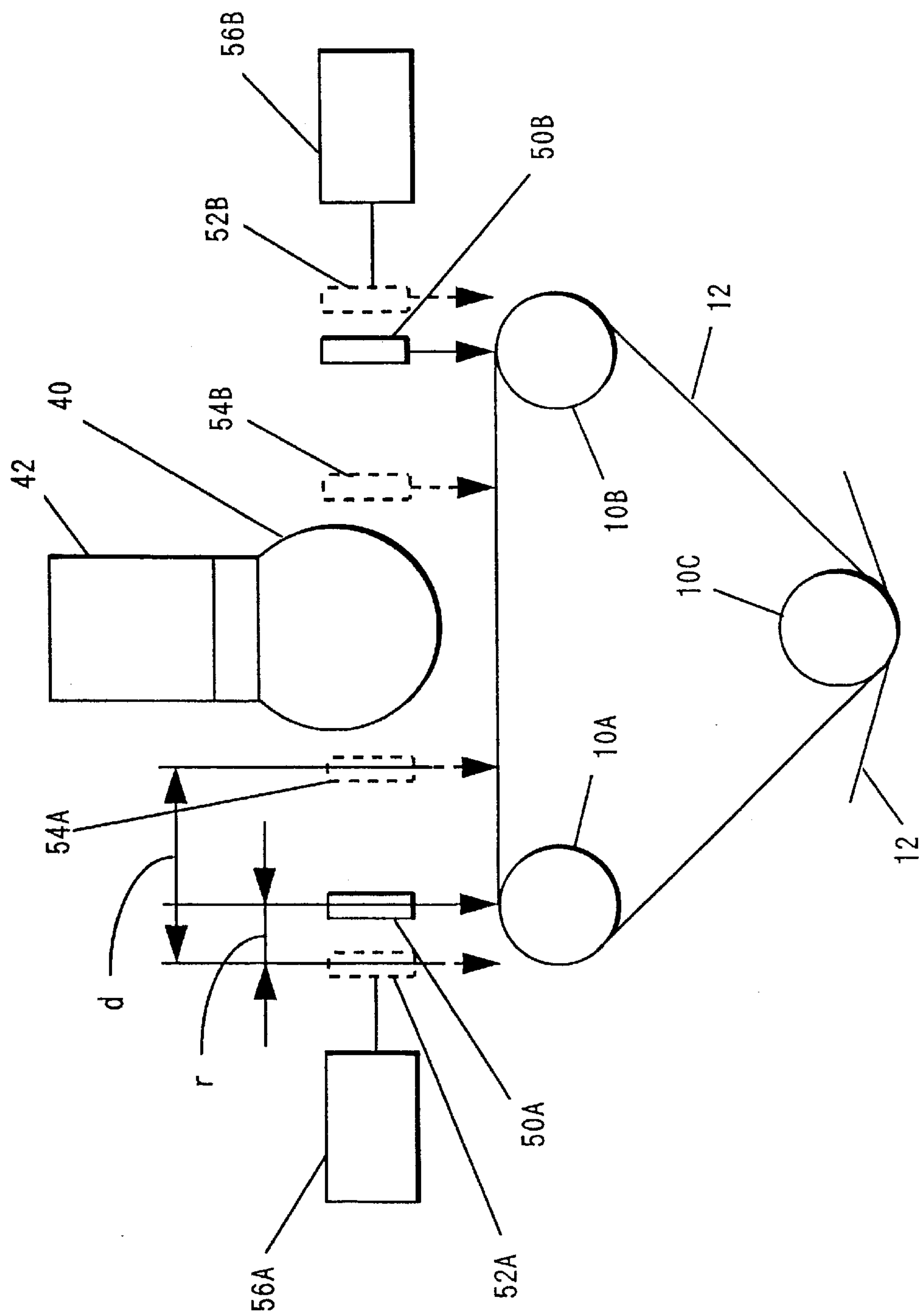
FIG. 4 is a schematic cross-section of a wire saw according to a second embodiment of the present invention.

FIG. 4 schematically shows the structure of a second embodiment of the present invention. As shown in FIG. 4, a slurry feed nozzle 50A or 50B can be moved along a wire 12 toward or away from a workpiece 40 to thereby vary the feed rate of the slurry fed to the workpiece 40. The slurry feed nozzle 50A or 50B is located most distant from the workpiece 40 (for example, a position indicated by numeral 52A or 52B) when slicing starts, and then moved toward the workpiece 40 as the cutting length increases. When the workpiece 40 is being sliced at the central portion thereof, the slurry feed nozzle 50A or 50B is located closest to the workpiece 40 (for example, a position indicated by numeral 54A or 54B). Subsequently, as the cutting length decreases, the slurry feed nozzle 50A or 50B is moved away from the workpiece 40. The cutting length is detected from the relative position between the wire 12 and the workpiece 40 as previously described. A moving mechanism 56A or 56B for moving the slurry feed nozzle 50A or 50B is preferably a combination of a drive motor attached to the slurry feed nozzle 50A or 50B and an encoder for detecting the position of the slurry feed nozzle 50A or 50B.

When the slurry feed nozzle 50A or 50B is moved in a direction opposite to the workpiece 40 from a position located just above the centerline of the roller 10A or 10B, slurry drops on the roller 10A or 10B at its outer side. As a result, part of the dropped slurry is scattered due to the centrifugal force of the rotating roller 10A or 10B, resulting in a reduction in the feed rate of the slurry fed to the workpiece 40 as compared with the case where slurry drops from just above the centerline of the roller 10A or 10B. The feed rate of the slurry fed to the workpiece slicing section is minimized when the slurry dropping position is located above the far end of the roller 10A or 10B as viewed from the workpiece 40 (a position indicated by numeral 52A or 52B). However, in order to secure the feed rate of the slurry required at the time of starting slicing, the slurry dropping position is preferably located approximately not more than 0.9 r distant as measured opposite to the workpiece 40 from a position located just above the centerline of the roller 10A or 10B (r is the radius of the roller 10A or 10B). The amount of scattering slurry is, for example, approximately 50% of the discharge from the slurry feed nozzle 50A or 50B when the slurry dropping position is located 0.5 r distant as measured opposite to the workpiece 40 from a position located just above the roller centerline.

As the slurry feed nozzle 50A or 50B is moved toward the workpiece 40, the feed rate of the slurry fed to the workpiece slicing section increases. When the slurry feed nozzle 50A or 50B is located in the proximity of the workpiece 40 as indicated by numeral 54A or 54B, the feed rate of the slurry to the workpiece slicing section is maximized. As described above, by moving the slurry feed position along the wire 12 within the range from a position located in the proximity of the workpiece 40 to a position corresponding to the far end of the roller 10A or 10B as viewed from the workpiece 40, the feed rate of the slurry fed to the workpiece slicing section can be varied as desired.

Examples of the first and second embodiments according to the present invention and a comparative example will now be described.

EXAMPLE 1

Figure 5:
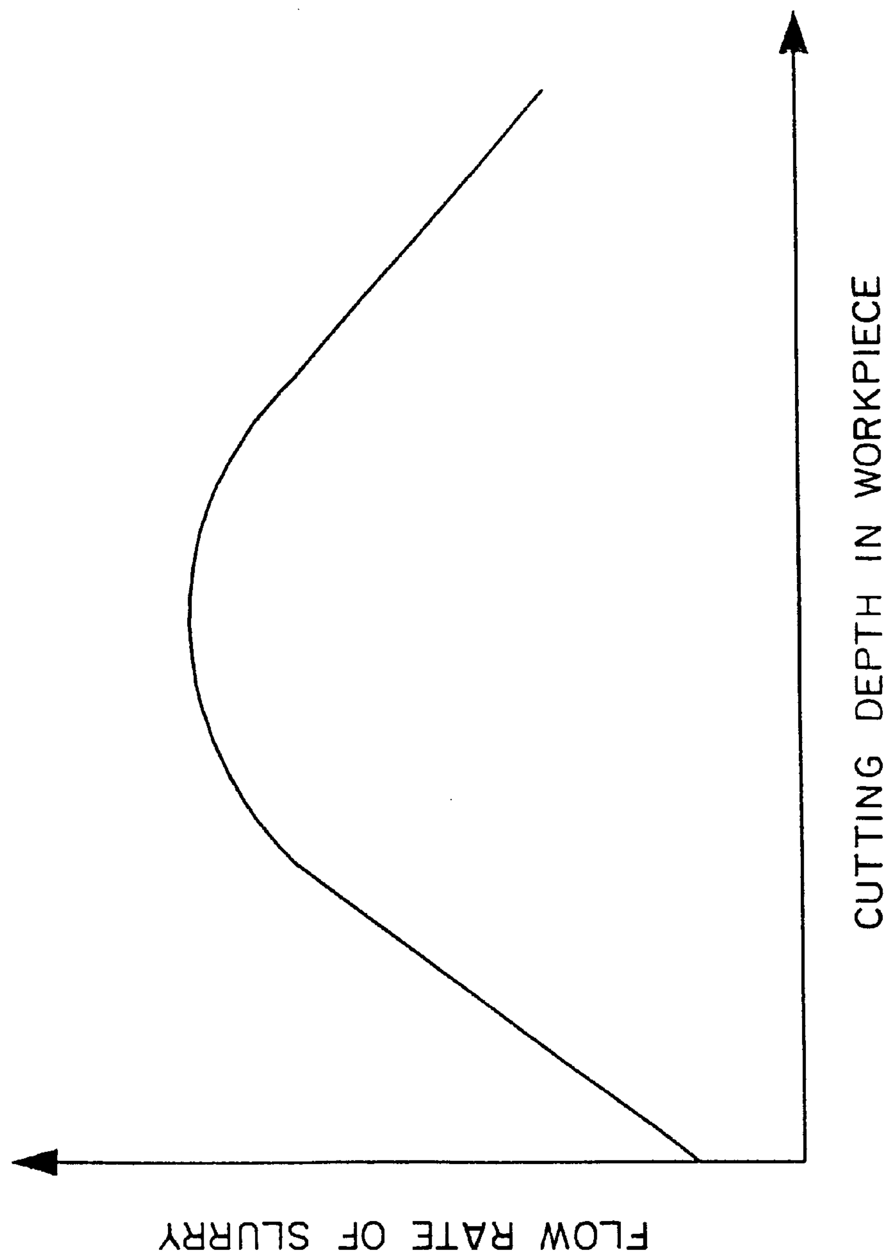
FIG. 5 is a graph showing variation of the flow rate of slurry when a cylindrical workpiece is sliced according to the first embodiment.
Figure 6:
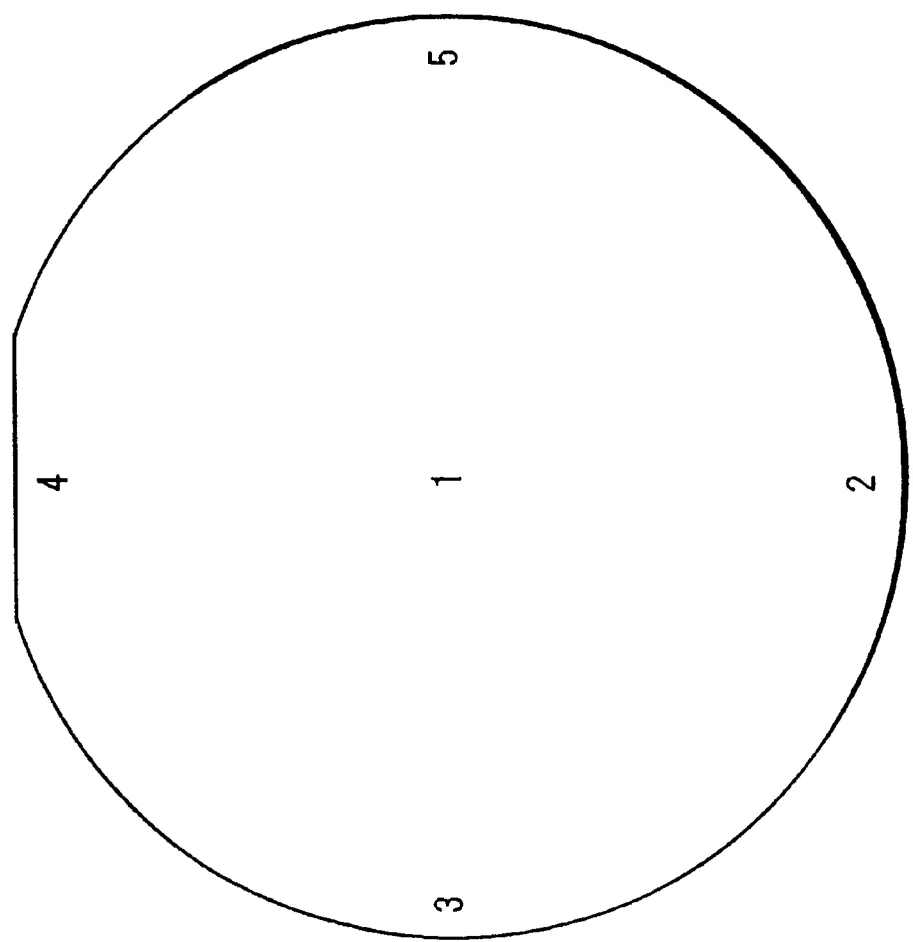
FIG. 6 is a view showing positions on a sliced wafer where thickness is measured.

An ingot of silicon single-crystal semiconductor having a diameter of approximately 200 mm was sliced using a wire saw of the above-described first embodiment. The flow rate of the slurry was varied according to a pattern shown in FIG. 5, which defines a variation in the flow rate with respect to the cutting depth in the workpiece. Specifically, a discharge from a slurry feed pump was 50 l/min when slicing was started, 120 l/min when the central portion of the ingot was subjected to slicing, and 70 l/min when slicing was ended. 10 ingots were sliced to obtain approximately 2500 wafers, while the flow rate of the slurry was varied according to the pattern of FIG. 5. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

EXAMPLE 2

Figure 7:
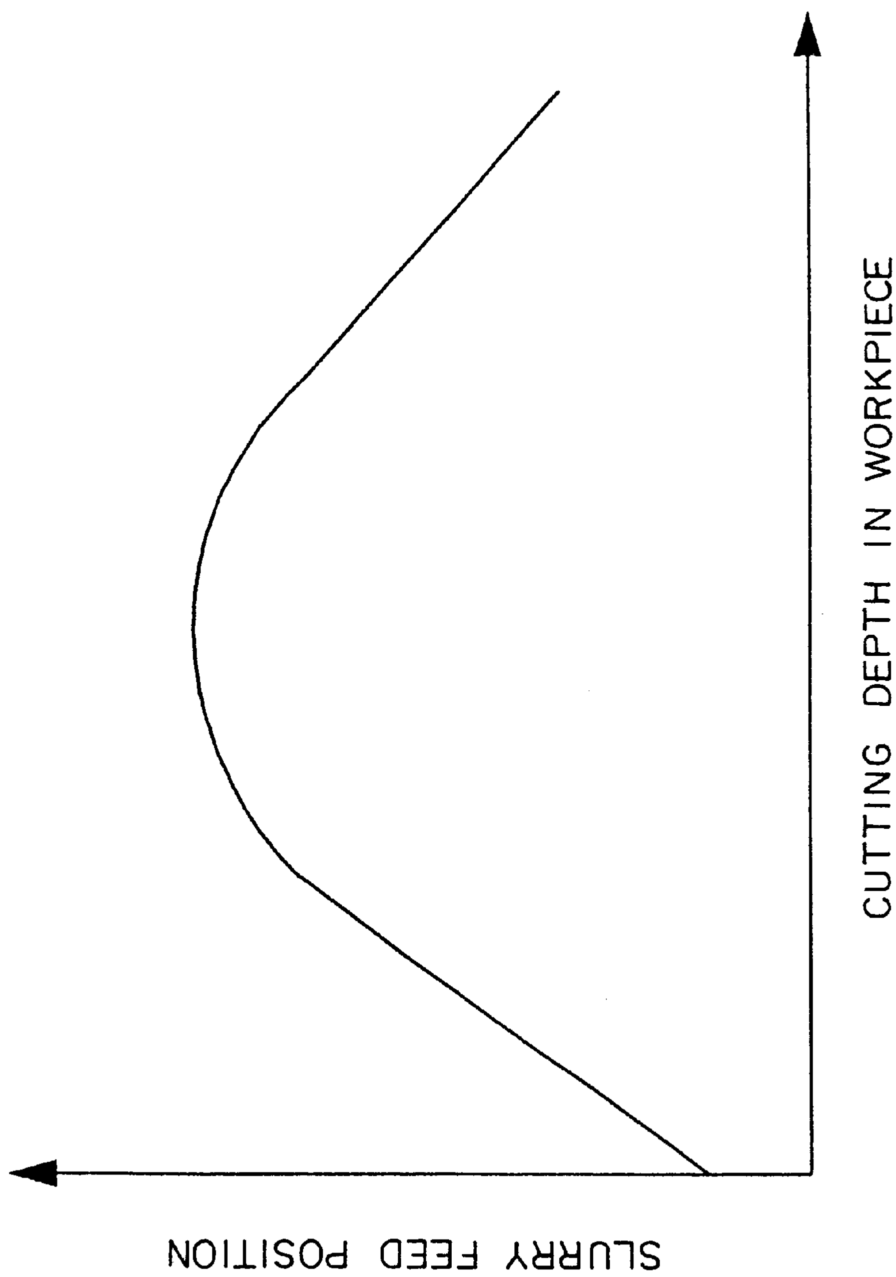
FIG. 7 is a graph showing variation of the feed position of slurry when a cylindrical workpiece is sliced according to the second embodiment.

An ingot of silicon single-crystal semiconductor having a diameter of approximately 200 mm was sliced using a wire saw of the above-described second embodiment. The flow rate of the slurry was maintained constant at 120 l/min during slicing. A slurry feed position was varied according to a pattern shown in FIG. 7, which defines a variation in the slurry feed position with respect to the cutting depth in the workpiece. Specifically, the slurry feed position was located 0.9 r distant as measured opposite to a workpiece from a position located just above the centerline of a roller when slicing was started, located just above the roller centerline when the central portion of the ingot was subjected to slicing, and located 0.6 r distant as measured toward the workpiece from a position located just above the roller centerline when slicing was ended. 10 ingots were sliced to obtain approximately 2500 wafers, while the slurry feed position was varied according to the pattern of FIG. 6. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Comparative Example 1

An ingot of silicon single-crystal semiconductor having a diameter of approximately 200 mm was sliced using a wire saw of the above-described first embodiment in a manner similar to that of Example 1 except that the feed rate of the slurry was maintained constant at 120 l/min during slicing. 5 ingots were sliced to obtain approximately 1000 wafers. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Table 1 shows the test results of Examples 1 and 2 and Comparative Example 1.

TABLE 1

| | Ingots (pcs) | Wafers (pcs) | Average TV5 (μm) | Crack generation (%) |
|---|---|---|---|---|
| Example 1 | 10 | 2503 | 10 | 0.2 |
| Example 2 | 10 | 2475 | 12 | 0.3 |
| Comparative Example 1 | 5 | 1036 | 25 | 3.5 |

In Example 1, only the flow rate of the slurry was varied, while in Example 2, only a slurry feed position was varied. However, both the flow rate of the slurry and the slurry feed position may be varied in combination so as to more finely control the feed amount of the slurry.

Figure 8:
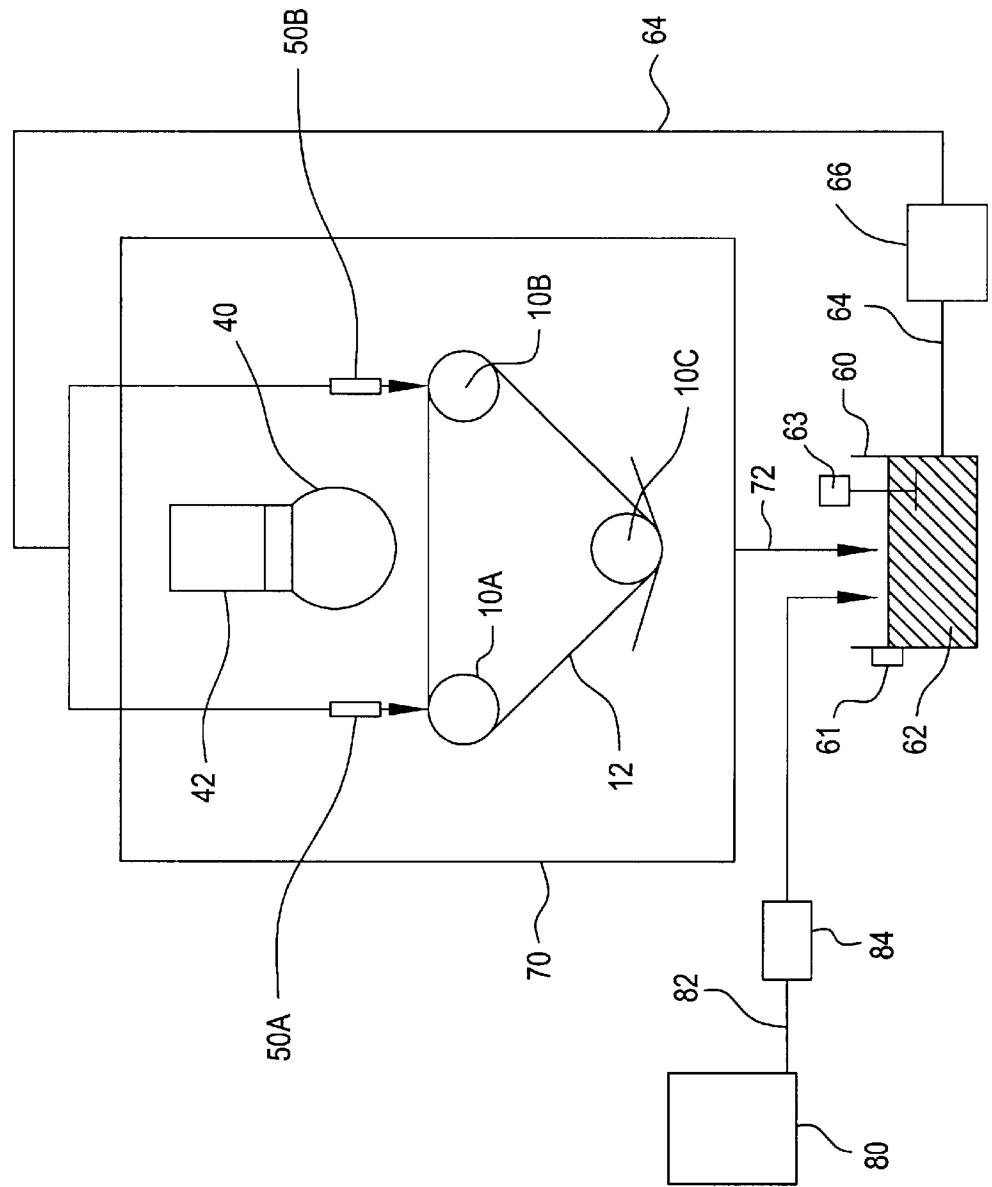
FIG. 8 is a schematic cross-section of a wire saw according to a third embodiment of the present invention and accompanied by a diagram of a slurry circulation system.

Next, a third embodiment of the present invention will be described. As shown in FIG. 8, in order to slice a cylindrical workpiece 40, slurry 62 contained in a slurry tank 60 is pressurized by a pump 66, fed to a slurry feed nozzle 50A or 50B through a slurry feed pipe 64, and then discharged onto a wire 12 from the slurry feed nozzle 50A or 50B, thereby being used for slicing the workpiece 40. Slurry scattering from a portion of the workpiece 40 being sliced, the wire 12, etc. is collected in the bottom portion of a wire saw cover 70. The thus-collected slurry is returned to the slurry tank 60 and then fed again to a portion of the workpiece 40 subjected to slicing through the slurry feed pipe 64, thereby being circulated for repeated use.

The slurry tank 60 has a slurry viscosity detector 61. A slurry viscosity control agent is fed from a viscosity control agent tank 80 to the slurry tank 60 through a viscosity control agent feed pipe 82. A solenoid valve 84 is provided in the viscosity control agent feed pipe 82. The opening of the solenoid valve 84 is controlled according to the viscosity of the slurry detected by the slurry viscosity detector 61 as well as according to the cutting length in a workpiece or the angle between a wire and the circumference of a workpiece, thereby adjusting the viscosity of the slurry contained in the slurry tank 60. A viscosity signal and an output from an encoder, used to detect an ingot holder position for determining the cutting length, are processed by a signal processor. A resulting signal from the signal processor is used to open/close the solenoid valve 84 so as to adjust the viscosity of the slurry. A generally employed viscometer may be used as the viscosity detector 61. Preferably, the viscosity of the slurry is obtained with a mass flowmeter or through the measurement of an electric conductivity. This is because a so-called on-line viscosity measurement can be implemented, so that the viscosity of the slurry can be controlled and managed accurately and readily.

In order to mix a fed viscosity control agent with the slurry 62 to make the viscosity of the slurry uniform in the slurry tank 60, a slurry stirrer 63 is preferably provided within the slurry tank 60. In place of the slurry stirrer 63, there may be used a generally employed method, for example, a rotating mechanism for rotating a stirring rod immersed in the slurry 62 with a motor, an oscillating mechanism, a vibrating mechanism, or the like.

The cutting length can be determined from the relative position between the wire 12 and the workpiece 40, for example, from the diameter of the workpiece 40 and the feed amount of the workpiece holder 42 relative to the wire 12.

As shown in FIG. 8, slurry is usually circulated. Since heat generated during the slicing of a workpiece causes water to evaporate from slurry, slurry collected in the slurry tank 60 has a very high viscosity. Of components of the slurry, abrasive grains and coolant are collected in a substantially whole quantity, since the abrasive grains are solid and the coolant is nonvolatile. Accordingly, what is lost from slurry during the slicing of a workpiece is water serving as a medium of the slurry.

Therefore, by using water as a viscosity control agent to adjust the water content of the slurry, the viscosity of the slurry can be adjusted. That is, by controlling the amount of water serving as a viscosity control agent and fed from the viscosity control agent tank 80, the viscosity of the slurry in the slurry tank 60 can be adjusted as desired.

When water is used as a viscosity control agent, a coolant component of the slurry is preferably water-soluble so as to be uniformly mixed with water.

As the viscosity of the slurry increases, slurry is more likely to adhere to a wire, so that slurry is more likely to be led into a work slicing section. As a result, much slurry is fed into the work slicing section, resulting in an increased work amount on a workpiece. On the contrary, as the viscosity of the slurry decreases, an opposite effect is produced.

Figure 9:
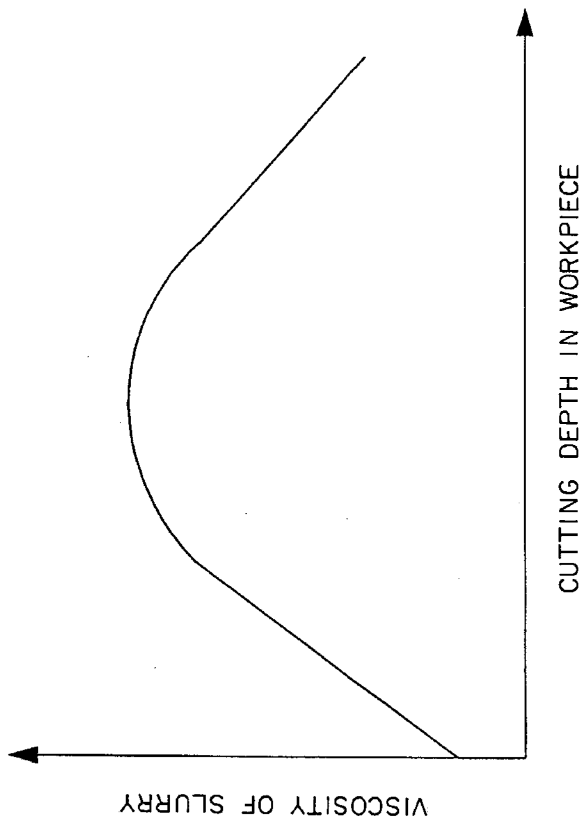
FIG. 9 is a graph showing variation of the viscosity of slurry when a cylindrical workpiece is sliced according to the third embodiment.

In the present embodiment, the viscosity of the slurry is adjusted according to the cutting length in a workpiece or the angle between a wire and the circumference of the workpiece, thereby uniformizing the thickness of each sliced wafer. That is, as represented by a pattern of the viscosity of the slurry shown in FIG. 9, the viscosity of the slurry is minimized when slicing is started, and then increased with the cutting length until it is maximized for slicing a workpiece at the central portion thereof. Subsequently, the viscosity of the slurry is decreased as the cutting length decreases.

The viscosity of the slurry is varied such that as compared with the rate of increase in the viscosity of the slurry during slicing from a slicing start portion to the central portion of a cylindrical workpiece, the rate of decrease in the viscosity of the slurry during slicing from the central portion of the workpiece to a slicing end portion is made lower.

This variation of the viscosity of the slurry copes with the fact that as shown in FIG. 1A, the work amount of a wire and slurry on a cylindrical workpiece is relatively small during slicing from the central portion of the workpiece to a slicing end portion as compared with slicing from a slicing start portion to the central portion of the workpiece.

An example of the third embodiment according to the present invention and comparative examples will now be described.

EXAMPLE 3

An ingot of silicon single-crystal semiconductor having a diameter of approximately 200 mm was sliced using a wire saw and method of the present invention. The viscosity of the slurry was varied according to a pattern shown in FIG. 9, which defines a variation in the viscosity of the slurry with respect to the cutting depth in the workpiece. Specifically, the viscosity of the slurry was 35 mPa•s when slicing was started, then was increased with the cutting length in the ingot until it reached 100 mPa•s for slicing the ingot at the central portion thereof, and subsequently decreased with the cutting length until it reached 60 mpa•s for slicing the ingot at the slicing end portion thereof. 10 ingots were sliced to obtain approximately 2500 wafers, while the viscosity of the slurry was varied according to the pattern of FIG. 9. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Comparative Example 2

An ingot of silicon single-crystal semiconductor having a diameter of approximately 200 mm was sliced in a manner similar to that of Example 3 except that the viscosity of the slurry was maintained constant at 60 mPa•s during slicing. 5 ingots were sliced to obtain approximately 1000 wafers. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Comparative Example 3

An ingot of silicon single-crystal semiconductor having a diameter of approximately 200 mm was sliced in a manner similar to that of Example 3 except that the viscosity of the slurry was maintained constant at 80 mPa•s during slicing. 5 ingots were sliced to obtain approximately 1000 wafers. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Table 2 shows the test results of Example 3 and Comparative Examples 2 and 3.

TABLE 2

| | Ingots (pcs) | Wafers (pcs) | Average TV5 (μm) | Crack generation (%) |
|---|---|---|---|---|
| Example 3 | 10 | 2508 | 10 | 0.2 |
| Comparative Example 2 | 5 | 998 | 25 | 3.7 |
| Comparative Example 3 | 5 | 1027 | 22 | 3.4 |

In the above-described third embodiment, water was used as a viscosity control agent. However, the present invention is not to be limited thereto. For example, any of various organic solvents or the like may be used.

Also, in the above-described third embodiment, a solenoid valve was used to control the amount of feed of a viscosity control agent. However, the present invention is not to be limited thereto. Any of other generally used valves, flowmeters, or the like may be used so long as they can control the amount of feed of a viscosity control agent.

Next, a fourth embodiment of the present invention will be described.

Figure 10:
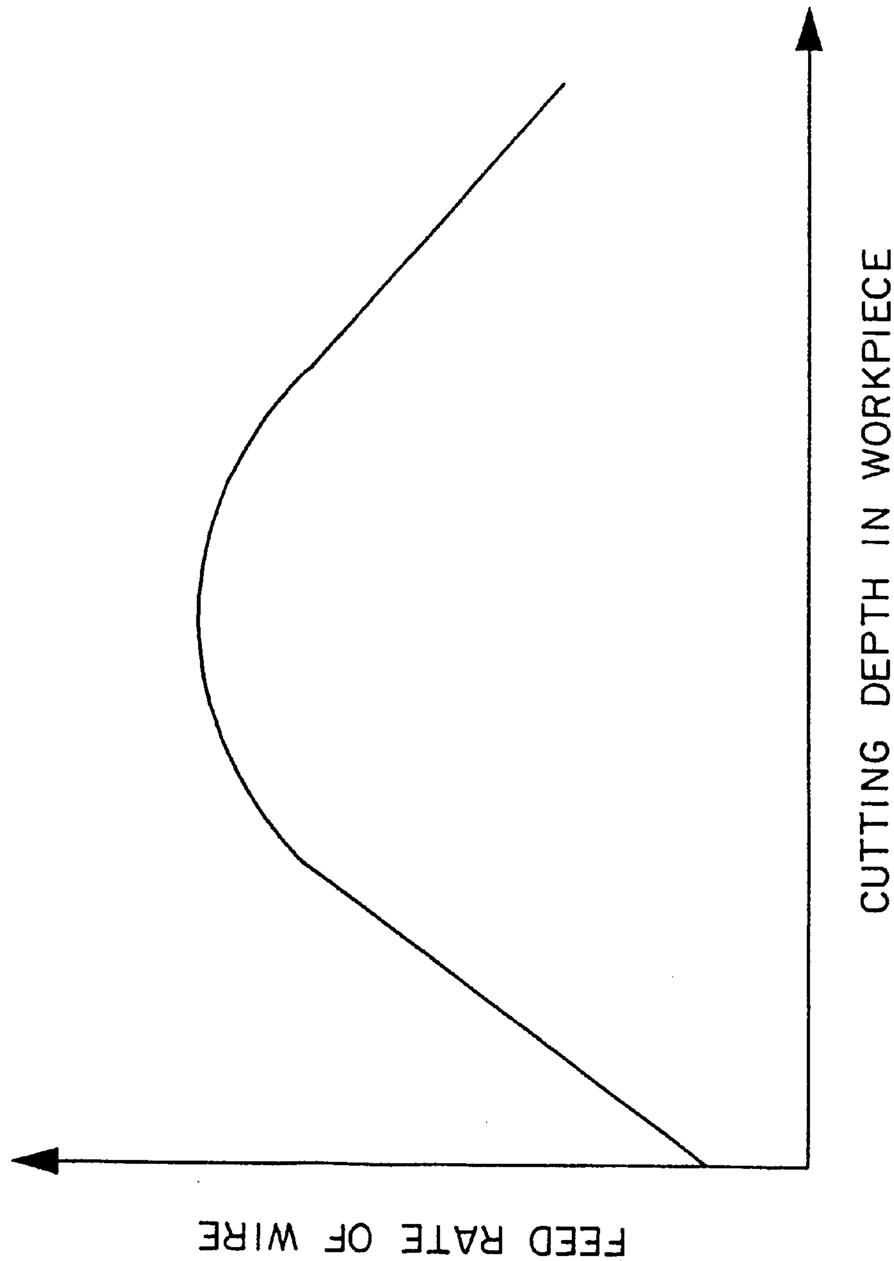
FIG. 10 is a graph showing variation of a wire feed rate when a cylindrical workpiece is sliced according to a fourth embodiment of the present invention.

In a wire saw according to the fourth embodiment, the feed rate of a wire 12 for slicing a workpiece 40 is varied according to the cutting length in the workpiece 40 or the angle between the wire 12 and the circumference of the workpiece 40. FIG. 10 shows a pattern of varying the feed rate of the wire 12. The feed rate of the wire 12 is lowest when slicing starts, then is increased with the cutting length in the workpiece 40 until it reaches a maximum for slicing the workpiece 40 at the central portion thereof, and subsequently decreased as the cutting length decreases.

The wire feed rate is varied such that as compared with the rate of increase in the wire feed rate during slicing from a slicing start portion to the central portion of a cylindrical workpiece, the rate of decrease in the wire feed rate during slicing from the central portion of the workpiece to a slicing end portion is made lower.

This variation of the wire feed rate copes with the fact that as shown in FIG. 1A, the work amount of a wire and slurry on a cylindrical workpiece is relatively small during slicing from the central portion of the workpiece to a slicing end point as compared with slicing from a slicing start point to the central portion of the workpiece.

In order to vary the feed rate of the wire 12, a servomotor, for example, may be used as a drive motor 7 connected to a roller 10C to rotate the roller 10C. Through the control of the rotational speed of this servomotor, the feed rate of the wire 12 can be controlled according to a predetermined pattern. In step with this variation of the wire feed rate, the wire take-up/release rate of wire take-up reed bobbins 22 and 32 may be controlled by means of torque motors 24 and 34.

The cutting length can be determined from the relative position between the wire 12 and the workpiece 40, for example, from the diameter of the workpiece 40 and the feed amount of the workpiece holder 42 relative to the wire 12.

An example of the fourth embodiment according to the present invention and a comparative example will now be described.

EXAMPLE 4

An ingot of silicon single-crystal semiconductor having a diameter of approximately 200 mm was sliced using a wire saw and method of the present invention. A wire feed rate was varied according to a pattern shown in FIG. 10, which defines a variation in the wire feed rate with respect to the cutting depth in the workpiece. Specifically, the wire feed rate was 100 m/min when slicing was started, then was increased with the cutting length in the ingot until it reaches 650 m/min for slicing the ingot at the central portion thereof, and subsequently decreased with the cutting length until it reaches 300 m/min for slicing the ingot at the slicing end portion thereof. 10 ingots were sliced to obtain approximately 2500 wafers, while the wire feed rate was varied according to the pattern of FIG. 10. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Comparative Example 4

An ingot of silicon single-crystal semiconductor having a diameter of approximately 200 mm was sliced in a manner similar to that of Example 4 except that the wire feed rate was maintained constant at 500 m/min during slicing. 5 ingots were sliced to obtain approximately 1000 wafers. The thickness of each of the thus-obtained wafers was measured at 5 points, namely a wafer center and 4 peripheral points (located 3 mm inside as measured from the wafer edge), as shown in FIG. 6, thereby obtaining a difference TV5 between the maximum and minimum thickness measurements.

Table 3 shows the test results of Example 4 and Comparative Example 4.

TABLE 3

| | Ingots (pcs) | Wafers (pcs) | Average TV5 (μm) | Crack generation (%) |
|---|---|---|---|---|
| Example 4 | 10 | 2512 | 10 | 0.2 |
| Comparative Example 4 | 5 | 1032 | 25 | 3.4 |

Figure 1B:
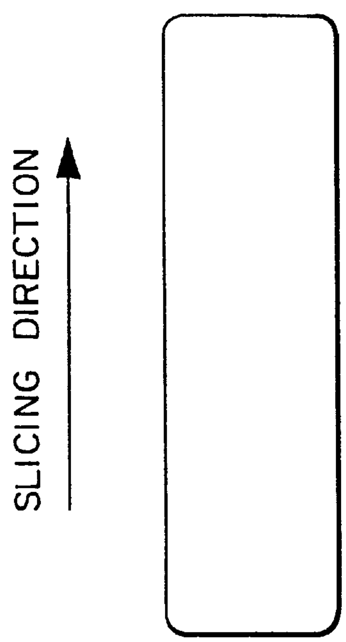
FIG. 1B is a schematic view showing the cross-section of a wafer obtained by slicing through the use of an apparatus and a method according to the present invention.

The cross-section of those wafers which are obtained through the use of a method and apparatus of the present invention is as shown in FIG. 1B, whereas the cross-section of those wafers which are obtained through the use of a conventional method and apparatus or in Comparative Examples 1 to 4 is convex on both sides thereof as shown in FIG. 1A, indicating that the present invention provides a significant improvement. As seen from Tables 1–3, compared with Comparative Examples 1 to 4, Examples 1 to 4 of the present invention show a smaller value of TV5 that indicates the degree of variation in the thickness of each wafer. Further, Examples 1 to 4 show a significant improvement in a crack generation percentage with wafers, probably owing to a smooth flat cut surface, as shown in FIG. 1B. Accordingly, the present invention can decrease variation in the thickness of each wafer while improving the yield of slicing and productivity.

The present invention is not limited to the above-described embodiments. The above-described embodiments are mere examples, and those having the substantially same structure as that described in the appended claims and providing the similar action and effects are included in the scope of the present invention.

For example, the term “cylindrical workpiece” appearing in the above description of the present invention does not necessarily denote the only prismatic workpieces having a completely circular cross-section. Cylindrical workpieces include workpieces having an elliptic cross-section, workpieces having a circular cross-section and a partial cut (so-called orientation flat), and the like. So long as a workpiece has a cross-section such that the cutting length or the angle between a wire and the circumference of the workpiece varies as slicing progresses, a pattern of varying a slurry feed rate, a slurry viscosity or a wire feed rate may be determined accordingly.

What is claimed is:

1. A method of slicing a cylindrical workpiece, comprising:

slicing a cylindrical workpiece with a wire; and varying a feed rate of a slurry fed to the workpiece during slicing with the wire;

wherein the feed rate of the slurry fed to the cylindrical workpiece is varied during slicing in correlation with variations in a cutting length of the wire in the cylindrical workpiece.

2. A method of slicing a cylindrical workpiece according to claim 1, wherein the feed rate of the slurry fed to the cylindrical workpiece is increased as the cutting length of the wire in the workpiece increases, and subsequently the feed rate of the slurry is decreased as the cutting length of the wire in the workpiece decreases.

3. A method of slicing a cylindrical workpiece according to claim 1, wherein the feed rate of the slurry is varied during slicing of the cylindrical workpiece such that the feed rate of the slurry is increased at a first rate during slicing from a slicing start portion to a central portion of the cylindrical workpiece, and the feed rate of the slurry is decreased at a second rate smaller than the first rate during slicing from the central portion of the cylindrical workpiece to a slicing end portion.

4. A method of slicing a cylindrical workpiece according to claim 1, wherein the feed rate of the slurry fed to the cylindrical workpiece is varied by changing a flow rate of the slurry fed to the wire.

5. A method of slicing a cylindrical workpiece according to claim 1, wherein the feed rate of the slurry fed to the cylindrical workpiece is varied by changing a feed position of the slurry fed to the wire.

6. A method of slicing a cylindrical workpiece according to claim 5, wherein the wire extends between first and second rollers, and the feed position of the slurry is varied along the wire between the first and second rollers from a position proximate to the cylindrical workpiece and a position proximate to a far end of the first and second rollers relative to the cylindrical workpiece.

7. A method of slicing a cylindrical workpiece according to claim 5, wherein the feed position of the slurry is located farthest from the cylindrical workpiece when slicing starts and is moved toward the workpiece when the cutting length of the wire in the cylindrical workpiece increases, so that the feed position of the slurry is located closest to the cylindrical workpiece when the cutting length reaches a maximum, and the feed position of the slurry is moved away from the workpiece as the cutting length decreases from the maximum cutting length.

8. A method comprising:

slicing a cylindrical workpiece with a wire saw; and varying the viscosity of a slurry of the wire saw during slicing of the workpiece in correlation with variations in a cutting length of the wire in the cylindrical workpiece;

wherein the viscosity is increased as the cutting length of the wire in the cylindrical workpiece increases, and the viscosity subsequently is decreased as the cutting length decreases.

9. A method of slicing cylindrical workpiece according to claim 8, wherein the viscosity of the slurry is increased at a first rate during slicing from a slicing start portion to a central portion of the cylindrical workpiece, and the viscosity of the slurry is decreased at a second rate that is smaller than the first rate during slicing from the central portion of the cylindrical workpiece to a slicing end portion.

10. A method of slicing a cylindrical workpiece according to claim 8, wherein the viscosity of the slurry in a slurry tank is varied by adding a viscosity control agent into the slurry tank, and the slurry in the slurry tank is fed to the cylindrical workpiece.

11. A method of slicing a cylindrical workpiece according to claim 10, wherein the viscosity control agent is water.

12. A method of slicing a cylindrical workpiece according to claim 8, wherein a coolant component of the slurry is water-soluble.

13. A method comprising:

slicing a cylindrical workpiece with a wire saw; and varying a feed rate of a wire of the wire saw during slicing of the workpiece in correlation with variations in a cutting length of the wire in the cylindrical workpiece;

wherein the feed rate of the wire is varied during slicing of the cylindrical workpiece in correlation with variations in the cutting length of the wire in the cylindrical workpiece; and wherein the feed rate of the wire is increased as the cutting length of the wire in the cylindrical workpiece increases, and the feed rate of the wire subsequently is decreased as the cutting length decreases.

14. The method according to claim 13, wherein the feed rate of the wire is increased at a first rate during slicing from a slicing start portion to a central portion of the cylindrical workpiece, and the feed rate of the wire is decreased at a second rate that is smaller than the first rate during slicing from the central portion of the cylindrical workpiece to a slicing end portion.

* * * * *